(12) United States Patent
Deckert

(10) Patent No.: US 6,287,187 B1
(45) Date of Patent: Sep. 11, 2001

(54) REUSABLE CARTRIDGE FOR PRODUCING SKINLESS SAUSAGE

(75) Inventor: Siegfried Deckert, Reppenstedt (DE)

(73) Assignee: Inotech GmbH (DE)

( * ) Notice: Subject to any disclaimer, the term of this patent is extended or adjusted under 35 U.S.C. 154(b) by 0 days.

(21) Appl. No.: 09/367,210
(22) PCT Filed: Feb. 11, 1998
(86) PCT No.: PCT/EP98/00761
  § 371 Date: Nov. 8, 1999
  § 102(e) Date: Nov. 8, 1999
(87) PCT Pub. No.: WO98/34489
  PCT Pub. Date: Aug. 13, 1998

(30) Foreign Application Priority Data

Feb. 11, 1997 (DE) ............................................ 197 05 152

(51) Int. Cl.⁷ .................................................. A22C 11/00
(52) U.S. Cl. .................................................. 452/30; 452/45
(58) Field of Search ........................ 452/30, 45; 426/513, 426/523; 428/36

(56) References Cited

U.S. PATENT DOCUMENTS

| 2,980,949 |   | 4/1961 | Stroh . |
| 3,152,358 |   | 10/1964 | Millenaar . |
| 3,528,825 |   | 9/1970 | Doughty ................................. 99/176 |
| 3,916,483 |   | 11/1975 | Vinokur . |
| 4,096,944 | * | 6/1978 | Simpson ............................... 206/219 |
| 4,437,206 | * | 3/1984 | Becker ................................... 452/30 |
| 4,476,609 | * | 10/1984 | Loudin ................................... 452/35 |
| 5,466,184 | * | 11/1995 | May ....................................... 452/30 |

FOREIGN PATENT DOCUMENTS

| 0 028 858 | 5/1981 | (EP) . |
| 1557553 | 2/1969 | (FR) . |
| 1106091 | 9/1978 | (IT) . |
| WO 93/07760 | 4/1993 | (WO) . |

\* cited by examiner

*Primary Examiner*—Willis Little
(74) *Attorney, Agent, or Firm*—Bachman & LaPointe, P.C.

(57) ABSTRACT

The present invention relates to a reusable cartridge for manufacturing a skinless sausage, having a tubular middle section and at least one adjoining sealing end made of a flexible synthetic material, whereby the middle section of the cartridge is formed integrally with the sealing end.

13 Claims, 4 Drawing Sheets

REUSABLE CARTRIDGE FOR PRODUCING SKINLESS SAUSAGE

BACKGROUND OF THE INVENTION

1. Field of the Invention

The present invention relates to a reusable cartridge for manufacturing a skinless sausage, having a tubular middle section and at least one adjoining sealing end made of a flexible synthetic material

2. Description of Related Art

Manufacturing skinless sausages is already known, in that sausage meat is infected into an endless cellulose gut which is then twisted off into lengths of the finished sausages at corresponding distances. After the ripening process the sausages, with the exception of frying sausages, are smoked, cooked and cooled, and the cellulose gut is then peeled off. The peeling process of the cellulose gut is carried out by hand and accordingly represents a time-intensive procedural step which is not entirely safe from the hygiene point of view. In addition, the cellulose guts can be used once only, so that during manufacture of the sausages a large quantity of used cellulose gut accrues which for the most part has to be disposed of and represents a high cost factor in sausage manufacturing.

Sausages cannot be manufactured fully automatically by the necessary procedural steps when carried out by hand.

Attempts have been made in the past to manufacture skinless sausages with the aid of cartridges. Here, a separate cartridge is provided for each subsequent sausage, into which the sausage mass is introduced.

A process of this type is described in DE-OS 25 23 506, for instance.

The essential problem which restricts the use of such cartridges for the manufacture of sausages lies in the expensive structure and complicated handling of the sealing caps. On the one hand, the sealing caps are to seal tightly, and on the other hand they are to enable the sausage meat to expand in the cartridge.

A cartridge is already known from DE-OS 41 34 249 which is equipped with a closure sleeve which is expansive to construct. In this connection, the closure sleeve is provided directly with a closure device which tightly seals an opening after filling. The sealing cap is connected solidly to the sleeve both during and after the filling process. As with the other known prior art, the sealing cap has to be set manually on both ends of the cartridge and later removed for cleaning the mould.

SUMMARY OF THE INVENTION

The object of the present invention is to improve the known cartridges such that they can be reused many times over, and also to enable simple cost-efficient manufacturing of the cartridges and the sausages.

This task is solved according to the present invention by the middle section of the cartridge being designed integrally with the sealing end.

This design of the cartridge has substantial advantages compared to the prior art. Since the sealing end is designed integrally with the tubular middle section of the cartridge, the procedural steps of placing and later removing the cartridge required to date in the prior art are dispensed with here. The cartridge according to the present invention enables the process to be carried into effect fully automatically, as no additional manual steps are required.

Of particular advantage also is the fact that the cartridge can be manufactured very easily with use of a single mould, substantially reducing cartridge manufacturing costs.

In a preferred embodiment of the cartridge the tubular middle section can be designed on both sides and on the front with an adjoining sealing end. In this way filling of the sausage meat and later ejection of the finished sausage is clearly simplified.

To obtain the desired shape of the finished sausage, the sealing end can be beneficially designed with the same diameter as the middle section where it connects to the tubular middle section, whereby it tapers towards the end at a distance from the tubular middle section. The characteristic half-shaped sausage end is obtained directly from the manufacturing and moulding process.

It is preferred if the end diameter of the sealing end corresponds to approximately two thirds of the diameter of the tube.

The sealing end is preferably designed with less wall thickness than the tubular middle section. In this respect, it has proven particularly advantageous if the wall thickness of the tubular middle section equals approximately three times the wall thickness of the sealing end. In this way, adequate elasticity of the sealing end is obtained which is especially necessary in sealing and forming the finished sausage.

In a preferred manner the sealing end can be provided, in the vicinity of its inner wall, with protruding rib elements which extend essentially over the length of the sealing end. It is particularly preferred here if the rib elements extend over a middle section of the sealing end connecting with the end of the sealing end and connecting with the area connecting with the tubular middle section. It is also preferred if five or six rib elements are provided.

The positioning of rib elements enables the sausages to be provided at both ends with various folds which simulate the classic twist-off effect in conventional sausages. At the same time the rib elements reinforce the stability of the sealing end, without influencing the necessary flexibility.

In accordance with another preferred embodiment a filling and ejection element is designed on the end of the sealing end lying opposite the tubular middle section.

The design further supports the fully automatic manufacture of a skinless sausage, because filling, sealing and subsequent ejection of the sausage can be effected without additional steps previously necessary, and the process is thus further simplified.

It has eventuated particularly advantageous if the tubular middle section, the sealing end and the filling and ejection element are designed integrally, with a filling and ejection element being provided on each sealing end. By making available a single shape which simultaneously serves as filling, sealing and ejection, any additional steps which were previously necessary, as already mentioned, are now dispensed with, where the filling element has to be connected manually to the cartridge.

To facilitate filling the filling and ejection element is designed preferably as a funnel-shape, where the end diameter of the filling and ejection element corresponds to double the diameter at the connection point to the connection end. A filling and ejection element designed in the form of a funnel has proven to be particularly preferable for supporting continuous filling of the sausage meat in the cartridge.

According to a preferred embodiment of the shape the filling and ejection element is designed with a wall thickness which corresponds approximately to two thirds of the wall thickness of the tubular middle section. In addition to this, to facilitate filling a flange can be designed at the end of the filling and ejection element at a distance from the sealing end and extending in a circle around this end. This flange can equally be used as bearing and support edge in a device.

According to a preferred embodiment the tubular middle section is designed with a diameter to length ratio of 1:4.4. It is also preferred if the ratio of lengths between the tubular middle section, the sealing end and the filling and ejection is 20:1:2.4.

The cartridge is preferably manufactured from a foodstuff-safe flexible synthetic material. PTFE or Teflon are particular preferences here.

The cartridge can also be bent in the vicinity of the tubular middle section to produce curved sausages.

In practice, it has proven particularly preferable to use a sealing device for closing off the sealing end of the reusable cartridge according to the present invention, comprising at least two convergent guideways which can be moved reciprocally transversely to their longitudinal extension, which delimit an opening surrounding the sealing component whose clear cross-section can be made smaller by reciprocal movement of the guideways in the manner of a sealing stop.

The sealing end is introduced into the opening between two mobile guideways only, which are moved reciprocally for closing for closing off the sealing end, by means of which the cross-section, into which the sealing end is introduced, is decreased, and in this way the end diameter of the sealing end is reduced even further.

Several identical guideways are arranged here in a row, such that a plurality of reusable cartridges can be sealed at the same time with a single sealing device. What has proven itself as a particularly preferred embodiment is the guideways being designed in the vicinity of a plate-shaped element, whereby there is a possible variant that the guideways are formed by bordering surfaces of the openings of an aperture.

Formation of the guideways within a plate-shaped element is, however, only a possible variant of the configuration; likewise, the guideways can be formed by bent or otherwise shaped elements. Plate-shaped elements are offered as a particularly simple variant, since both plate-shaped elements can be easily displaced towards one another.

According to another preferred embodiment the sealing devices can be arranged above one another in pairs, preferably arranged above one another in pairs with a preset distance, whereby the preset distance corresponds to the distance of the two scaling ends of the cartridge from one another.

Through this configuration it is possible to seal both sealing ends of the cartridge according to the present invention in one step and thus to render operation even easier.

Provision can also be made for the guideways to be designed drop-shaped, whereby the semicircular-shaped elements of the drop are expanded to the opening surrounding the sealing component.

It has also proved advantageous when the sealing devices arranged in pairs above one another are arranged in a cassette.

The sealing device can be operated by means of a pneumatic or electromotor forward feed system.

The invention will now explained hereinafter in greater detail by means of embodiments with reference to the accompanying diagrams, in which:

DETAILED DESCRIPTION OF THE INVENTION

Figure 1:
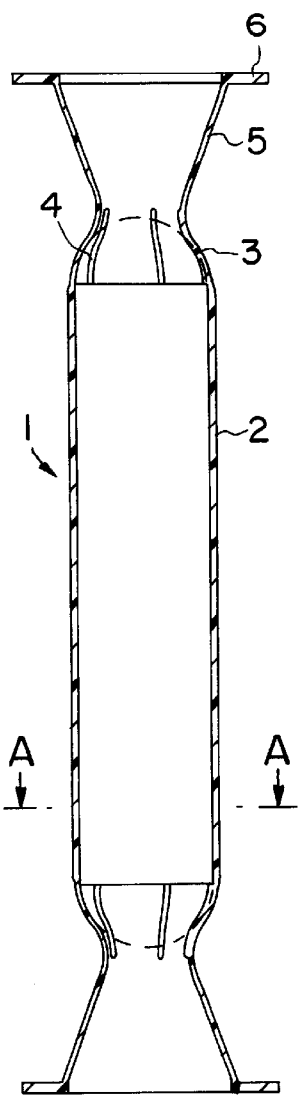
FIG. 1 shows a cartridge according to a first embodiment of the invention in a vertical section.

FIG. 1 illustrates a cartridge according to the present invention in a longitudinal section. Cartridge 1 comprises a tubular middle section 2 which is fitted on both sides at its ends with sealing ends 3 which are structured and designed substantially identically in the embodiment described here.

Sealing ends 3 are here connected integrally to tubular middle section 2 and taper towards the end at a distance from the tubular middle section. In the embodiment illustrated in FIG. 1 sealing end 3 first tapers in an arc and then gradually transitions into the end diameter. In operation, this achieves the characteristic half-round end of the finished sausage.

Funnel-shaped filling and ejection elements 5 are connected to the sealing ends. Here, the transition between sealing end 3 and filling and ejection element 5 is designed integrally. Filling and ejection element 5 widens out from sealing end 3 and reaches the end of maximum diameter at a distance from sealing end 3.

Formed on the ends at a distance from the closing end of filling and ejection element 5 is a flange 6 which encircles the filling and ejection element and extends radially outwards.

Figure 3:
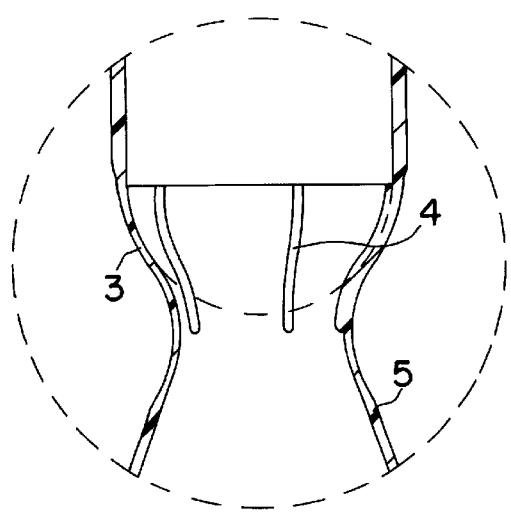
FIG. 3 shows a detail of the cartridges illustrated in FIG. 1, whereby the sealing end is enlarged.

As illustrated in detail FIG. 3, sealing end 3 is formed on its inner wall with additional rib elements 4 which project inwards and extend along the sealing element longitudinally and substantially over the entire length. The rib elements here extend only over a middle section of sealing end 3, formed between the neck area between sealing end 3 and tubular middle section 2, as well as between sealing end 3 and filling and ejection element 5. Because the rib elements do not extend to the neck areas, the stability of the sealing end is increased only in its middle section; at the same time, however, adequate flexibility of the neck areas is guaranteed, such as with distortions arising during operation.

Figure 2:
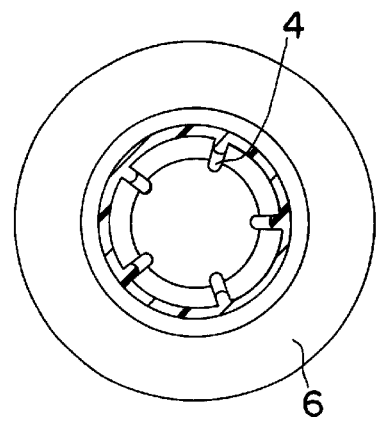
FIG. 2 shows a horizontal section of the cartridge in section A—A illustrated in FIG. 1.

The cartridge according to the present invention is designed with various wall thicknesses, as illustrated in FIGS. 1 to 3. Here, the walls of tubular middle section 2 are the thickest so that this area shows minimal elasticity only during operation, whereby the dimensions hardly alter. In relation to the wall thickness of tubular middle section 2 sealing ends 3 are designed with a minimal wall thickness corresponding to about two thirds one third of the wall thickness of the tubular middle section. Filling elements 5 connecting to sealing ends 3 are designed with a wall thickness corresponding to about of the wall thickness of the tubular middle section. The flange is also designed with a wall thickness and size such that the shape can be borne only by the flange during operation.

A different flexibility is attained over the length of the form by means of the varying wall thicknesses. The flexibility is thus greatest in the vicinity of the sealing end and it is therefore possible to reduce the end diameter of the sealing end even further by external influence, or to increase it during ejection of the finished sausage.

A foodstuff safe synthetic material, such as Teflon or PTFE, is the preferred choice for material for the cartridge according to the present invention.

The dimensions of the cartridge according to the present invention given in FIG. 1 have proven to be particularly suited to a sausage weighing 80 g, 26 mm in diameter and 146 mm in length.

Figure 6:
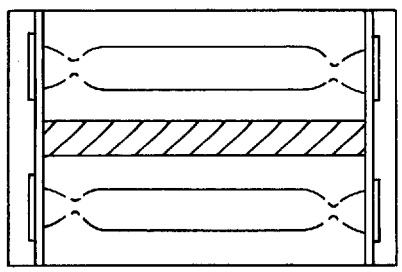
FIG. 6 shows the transport carrier illustrated in FIG. 4 in cross-section.
Figure 4:
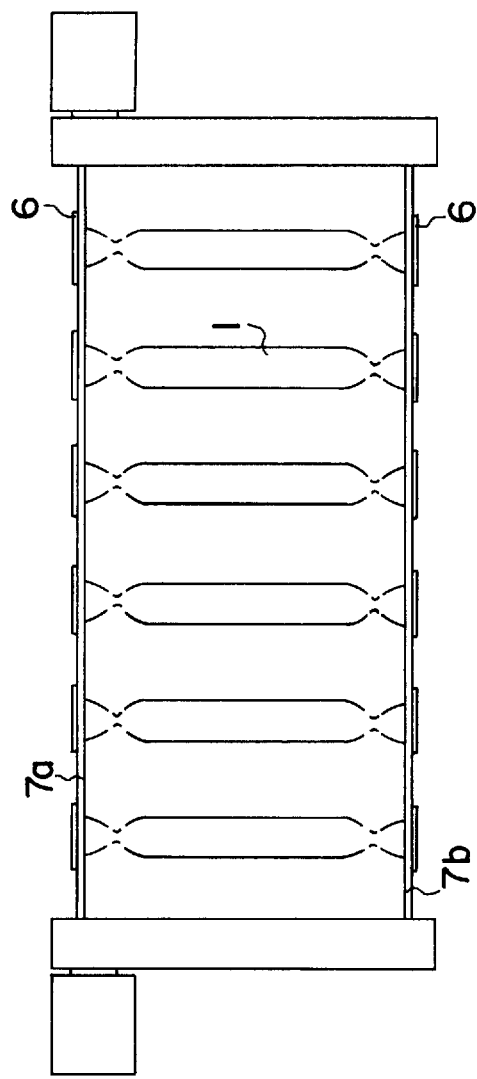
FIG. 4 shows a plurality of cartridges according to the present invention which are mounted next to one another in two rows in a transport carrier.
Figure 5:
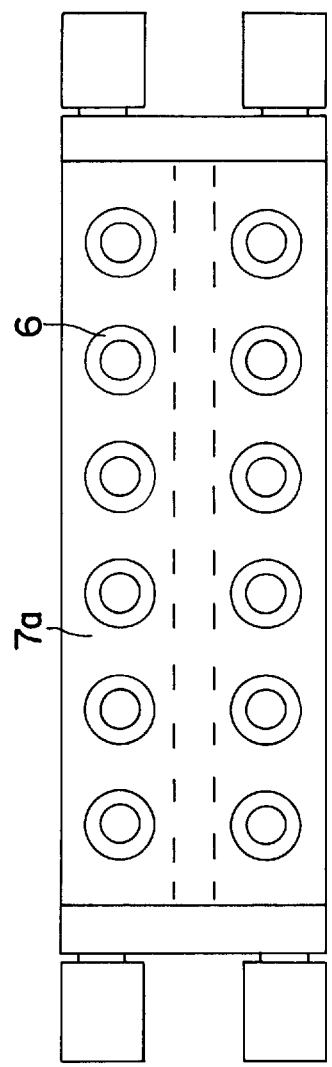
FIG. 5 shows the transport carrier illustrated in FIG. 4 in plan view.

FIG. 4 illustrates a plurality of cartridges according to the present invention which are already incorporated into a transport carrier. Here, each of the cartridges is attached or tensed between tow plate-shaped elements 7a and 7b, whereby the cartridges are arranged in circular openings in plate-shaped elements 7a and 7b and are supported respectively on the side of plate-shaped elements 7a and 7b averted from the cartridge, with flange 6 formed in the vicinity of the filling and ejection element. The transport device or the transport carrier is illustrated in FIG. 5 in aspect or in FIG. 6 in cross-section. The transport carrier can be expanded here in any way, such as by arranging other cartridges in the carrier.

Figure 7:
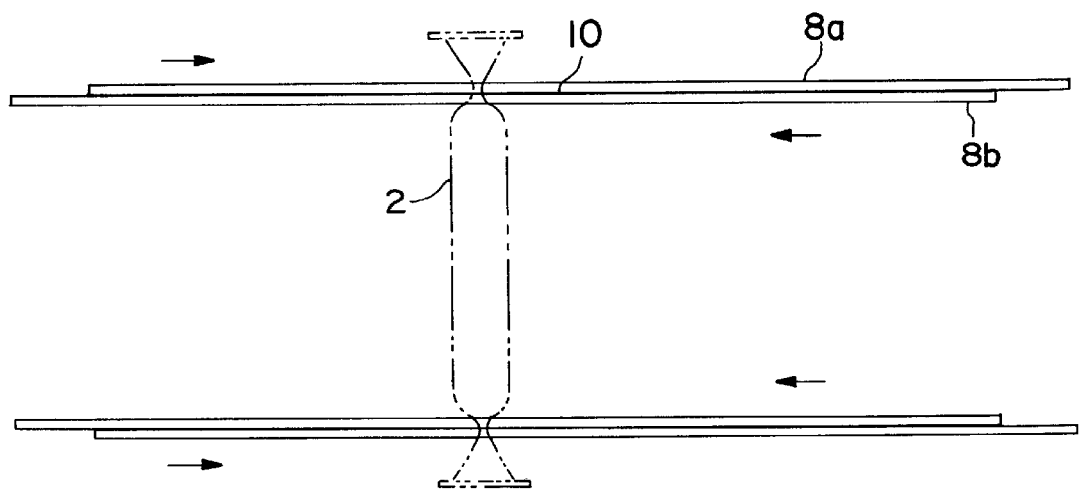
FIG. 7 shows a sealing device for sealing the cartridge according to the present invention.

Furthermore, a sealing device can be arranged within the transport carrier, not illustrated in FIG. 4, however. A corresponding sealing device is shown in FIG. 7. The sealing device hereby comprises each of two plate-shaped elements 8a, 8b, arranged directly on top of one another and exhibiting guideways 10. In this connection, guideways 10 are arranged relative to one another such that they delimit an opening. The cartridge is introduced into this opening in such a way that the opening is arranged on a plane with the end of sealing end 3 of the cartridge, that is, the end with the narrower diameter.

Figure 8A:
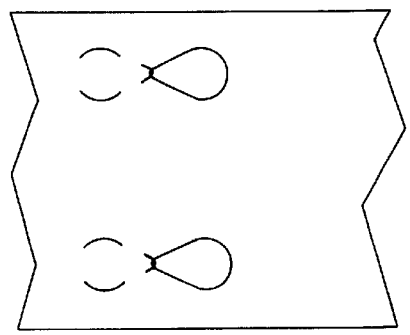
FIGS. 8a and 8b show the sealing device illustrated in FIG. 7 in aspect in the open and closed state.
Figure 8B:
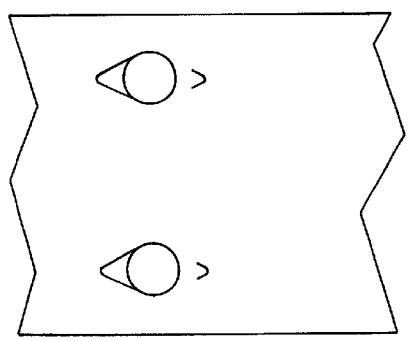

To sealing end 3 of the cartridge two plates 8a, 8b fitted with guideways 10 are moved towards one another, whereby the clear cross-section of the opening enclosed by guideways 10 is reduced all round. In this way, the enclosed diameter of sealing end 3 is decreased uniformly from all sides, and the cartridge is sealed to the pint where no more sausage meat goes through the sealing end. The view of a sealing device is illustrated in FIGS. 8a and 8b, where both the open and the closed state is illustrated without the inserted cartridge. In the case of the illustrated sealing opening guideways 10 are formed by bordering surfaces of drop-shaped openings in plates 8a, 8b. Both plates are arranged on one another such that the semicircular areas of the drop-shaped openings come to rest next to one another and thus form a circular opening. The sharp ends of the drop-shaped openings are to the right and left near the circular opening. If both plate-shaped elements 8a, 8b are displaced reciprocally, that is, moved towards one another, both semicircular areas of the drop-shaped openings retreat and the sharp ends of the drop-shaped elements are slowly moved towards one another. In the closed state the opening is then formed by the sharp ends only.

The lower sealing end as well as the upper sealing end of the cartridge are enclosed by a sealing device in operation, as in FIG. 7. In this connection both sealing devices can be controlled independently of one another, that is, it is feasible to seal first the lower end, fill the cartridge and then seal the upper end. The sealing device is preferably formed directly inside the transport carrier.

Figure 9:
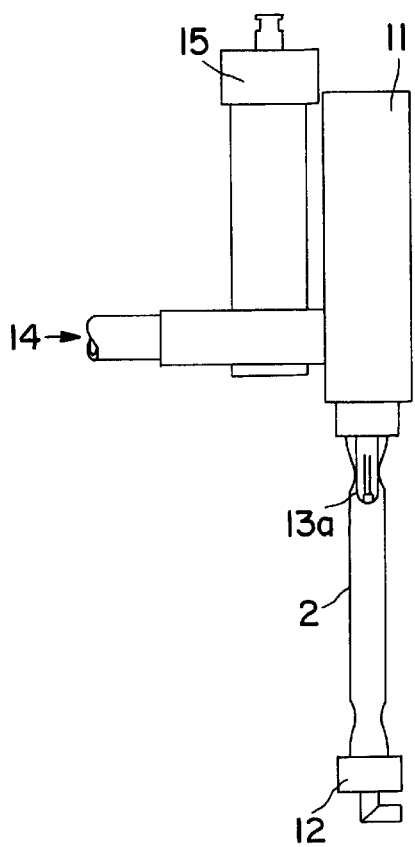
FIG. 9 shows filling of the cartridge according to the present invention according to a first embodiment.
Figure 10:
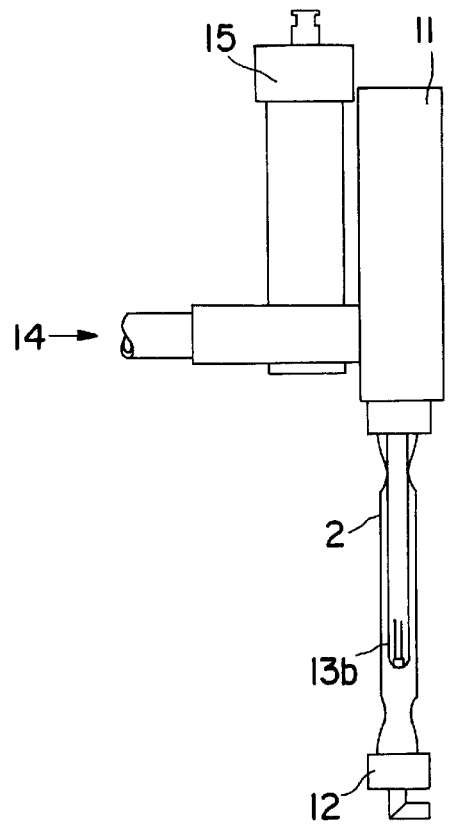
FIG. 10 shows filling of a cartridge according to the present invention according to a second embodiment.

The modus operandi and functioning of the cartridge according to the present invention will be described hereinafter with reference to FIGS. 9 and 10, as well as to FIGS. 4 and 7. The cartridges according to the present invention are introduced into a readied transport carrier and placed automatically into the filling position. Filling heads 11 travel by way of a pneumatic or electromotor plunger station to the upper area of cartridge 1 and at the same time vacuum suction knobs 12 travel to the lower area of the cartridge. Cartridges 1 are evacuated by a vacuum pump, by means of which a negative pressure is generated in the cartridge to facilitate entry of tubular filling tool 13a, 13b. Lower sealing end 3 is then closed and at the same time sausage meat 14 is pushed into tubular middle section 2 by means of the filling head and a metering device 15. Here it is irrelevant whether this filling head is a vacuum filling head 13a, as illustrated in FIG. 9, or a submersible tube filling head 13b, as illustrated in FIG. 10. Submersible tube filling head 13b is used for longer sausages and for sausages having a larger cross-section.

With submersible tube filling head 13b the filling head, as illustrated in FIG. 10, is fitted with a filling tube which dips into cartridge 1 cup to one third of the sausage length and is then retracted upwards out of the cartridge as the filling tool is delivering the sausage meat to the tubular middle section. With this embodiment the cartridge can also be filled without a vacuum being generated in the cartridge.

Next the upper sealing end is closed. In this respect, the sealing device can be closed manually, pneumatically or electrically, according to wish. The cartridges filled with sausage meat travel together with the transport carrier to the subsequent procedural step and at the same time an empty transport carrier provided with cartridges is conveyed to the filling station.

The transport carriers equipped with filled cartridges can then be forwarded to further processing stations such as a maturing station, a smoking station and the like. As soon as the sausages are made in the cartridges, that is, matured and reddened, they can be withdrawn from the cartridges in a simple manner by opening of upper and lower sealing end 3. To facilitate ejection of the sausages from the cartridges, a compressed air tool can be set in the upper region of the cartridge in order to simply blow the sausage out of the cartridge with compressed air. In this connection, the end of the sealing end of the cartridge is prised apart easily by the diameter of the sausage and ejection of the sausage is facilitated.

What is claimed is:

1. A reusable cartridge for manufacturing a skinless sausage comprising a tubular middle section and at least one adjoining sealing end made of a flexible synthetic material, wherein the tubular middle section of the cartridge is formed integrally with the sealing end, and wherein the sealing end has an inner wall, and wherein the sealing end in the vicinity of its inner wall is provided with rib elements which extend over at least a portion of the length of the sealing end.

2. A reusable cartridge according to claim 1, wherein the rib elements extend over a middle section of the sealing end which is formed between an area connecting with the tubular middle section and the end area of the sealing end.

3. A reusable cartridge according to claim 1, including one of five and six rib elements.

4. A reusable cartridge for manufacturing a skinless sausage, comprising a tubular middle section and at least one adjoining sealing end made of a flexible synthetic material, wherein the tubular middle section of the cartridge is formed integrally with the sealing end, further including a filling and ejection element formed on the end of the sealing end, and including a flange formed at the end of the filling and ejection element at a distance from the sealing end and extending in a circle around the end.

5. A sealing device for closing off the sealing end of a reusable cartridge or manufacturing skinless sausages, which comprises: a reusable cartridge for manufacturing a skinless sausage having a tubular middle section and at least one adjoining sealing end made of a synthetic material, wherein the tubular middle section of the cartridge is formed integrally with the sealing end; at least two convergent guideways which are able to move reciprocally transversely to their longitudinal extension, which delimit an opening surrounding the sealing end whose cross section can be made smaller by reciprocal movement of the guideways in a manner of a sealing stop.

6. A sealing device according to claim 5, including several identically shaped guideways arranged in a row.

7. A sealing device according to claim 5, wherein the guideways are formed in the vicinity of a plate-shaped element.

8. A sealing device according to claim 5, wherein the guideways are formed by bordering surfaces of the openings of an aperture.

9. A sealing device according to claim 5, wherein the sealing devices are arranged one above the other in pairs.

10. A sealing device according to claim 5, wherein the sealing devices are arranged one above the other in pairs with a preset distance therebetween, wherein the preset distance corresponds to the distance of the sealing ends of the cartridge from one another.

11. A sealing device according to claim 5, wherein the guideways are designed drop-shaped including semicircular-shaped elements thereof, wherein the semicircular-shaped elements are expanded to the opening surrounding the sealing components.

12. A sealing device according to claim 5, wherein said device is arranged in pairs one above the other and in a cassette.

13. A sealing device according to claim 5, wherein the sealing device includes a pneumatic or electromotor forward feed system.

\* \* \* \* \*